June 2, 1959 G. G. HUME 2,888,905
BIRD FEEDER
Filed Aug. 15, 1956 2 Sheets-Sheet 1
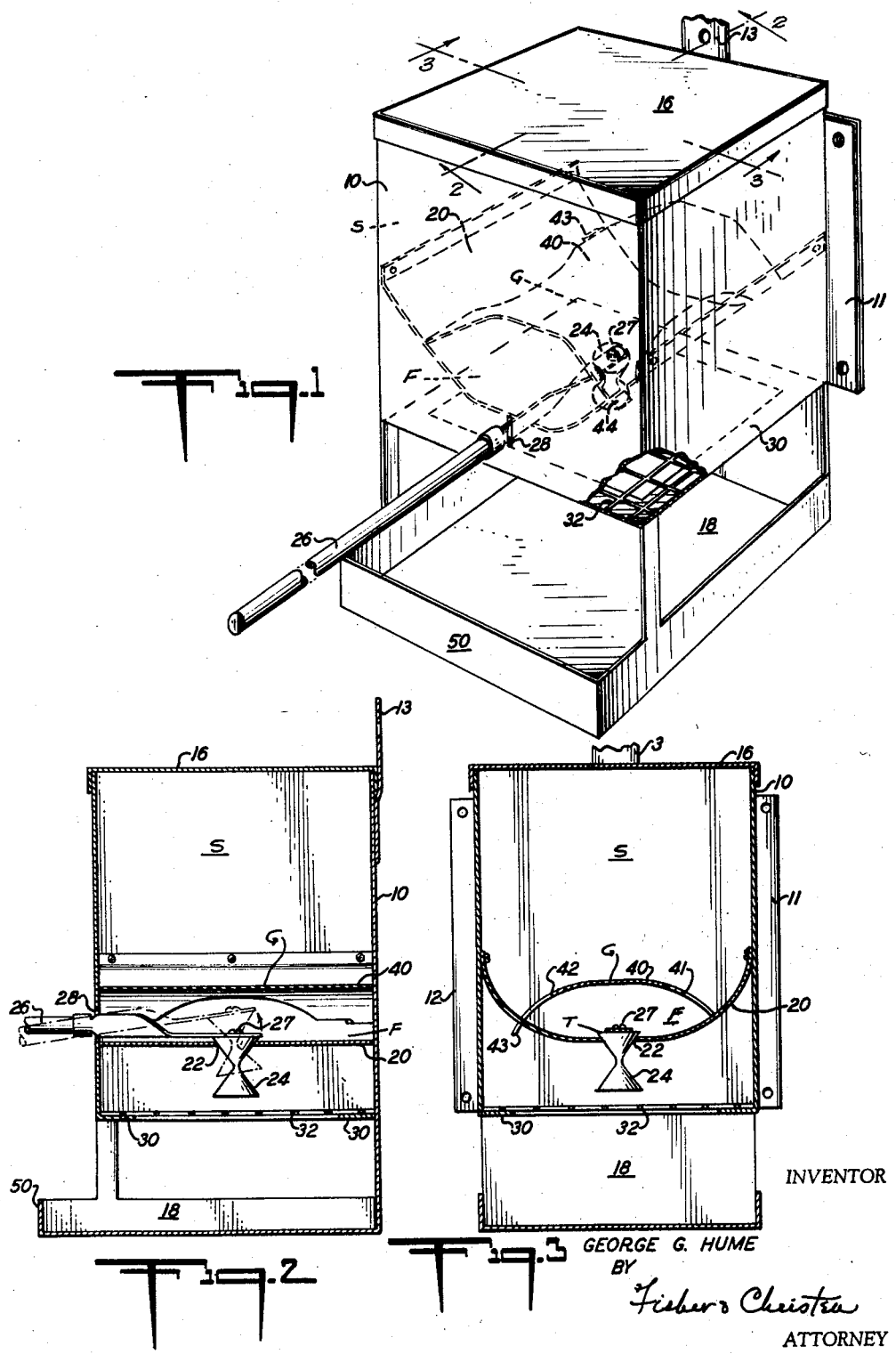
INVENTOR
GEORGE G. HUME
BY
*Fisher & Christen*
ATTORNEY June 2, 1959 G. G. HUME 2,888,905
BIRD FEEDER
Filed Aug. 15, 1956 2 Sheets-Sheet 2
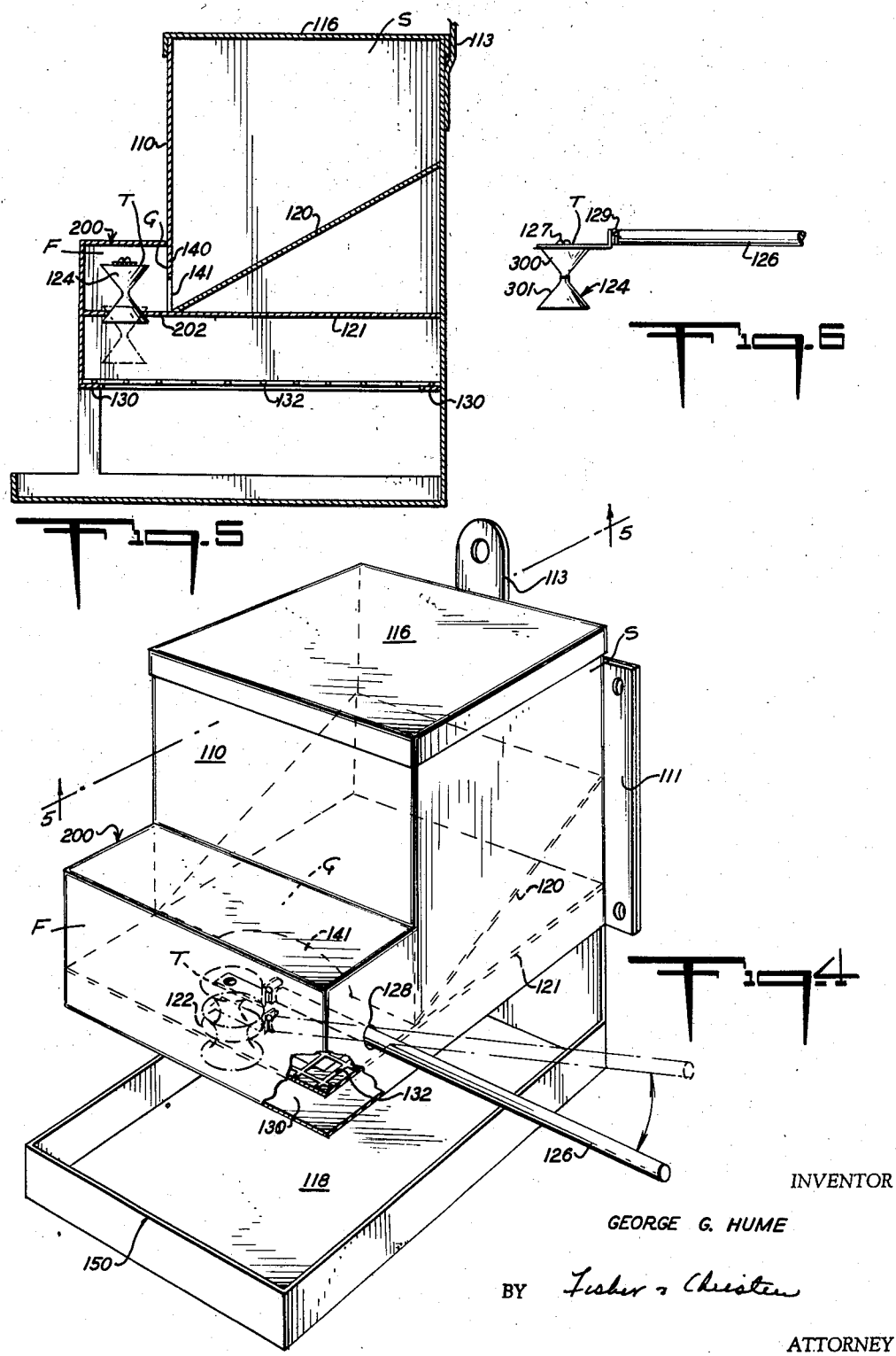
INVENTOR
GEORGE G. HUME
BY Fisher & Christen
ATTORNEY

United States Patent Office 2,888,905
Patented June 2, 1959

2,888,905

BIRD FEEDER

George G. Hume, Washington, D.C.

Application August 15, 1956, Serial No. 604,226

13 Claims. (Cl. 119—55)

The present invention relates to an apparatus for feeding birds. One of the objects of this invention is to provide a means for dispensing small quantities of grain to song birds from a feeder which cannot or will not be robbed by larger birds, squirrels and the like.

Another object of this invention is to provide a bird feeder which will dispense only small quantities of grain at any one time.

Still another object of the invention is the provision of a valve assembly particularly adapted to use in bird feeders.

Another object of this invention is to provide a storehouse of grain enabling birds to feed without human assistance.

Yet another object of the invention is the provision of means for permitting a gravity feed dispensing apparatus to operate independently of the weight of grain in the hopper.

Other objects of the invention will be more readily apparent from the following description.

In general terms, the objects of this invention are accomplished by a structure which comprises a container for holding a substantial quantity of grain or other bird feed, a gravity valve or dispensing mechanism positioned in the bottom of the container means, including a perch for actuating said valve, and means for preventing rodents and larger birds from stealing the grain. One feature of the invention is the valve structure which includes an aperture in the bottom of the container and an hour-glass valve member positioned in the aperture for movement from an upper closed position to a lower closed position with a dispensing action therebetween. The hour-glass shape shown in the drawings is a preferred construction of this valve member. However, it will be understood that other equivalent valve members may be used, it being critical, as to this feature, only that such valves shall have an upper portion and a lower portion of a diameter greater than the diameter of the aperture in the bottom of the container and that means are provided intermediate the upper and lower portions for dispensing material as the valve is reciprocated.

A part of this valve feature is the means provided for its reciprocation. Such means in one modification are preferably a single lever having one end pivotally attached to the top of the valve member and the other end extending outside the container to form a perch for birds. Intermediate the ends of the lever is a fulcrum preferably formed by the wall of the container, as this minimizes the size of the opening thereby minimizing the danger of having water blown into the feeder. (It will be understood that water-contaminated grain becomes rapidly infested with fungus growth which is often fatal to birds.) Another important feature of this valve assembly is that the effective weight of the valve and lever on the one side and the perch on the other side are so regulated that when a song bird lands on the perch the valve is raised and the feeder is primed with a few grains being dispensed. When the bird leaves the perch to get the grain already available, the valve is lowered and an additional small amount of grain is dispensed.

A somewhat separate and yet closely related feature of the dispensing system of this device is the means provided for keeping the valve operation independent of the quantity of grain. Such means ordinarily include two separate compartments within the container; one for store of grain to be fed and a separate compartment for housing the feed valve assembly.

To achieve automatic gravitation operation, it is necessary that the bottom of the feed compartment be lower than the upper feed level of the storage compartment. Preferably the bottom of the feed compartment is below the bottom of the storage compartment and the two compartments can be located either side by side or one above the other. In order to achieve the desired result, it is critical that there be gravity flow means, including an opening in the wall separating the two compartments for automatically delivering feed from the storage compartment to the feed compartment while maintaining a level of feed at the valve opening below the top of the reciprocating valve. Preferably such means include merely a hole of predetermined size spaced a substantial distance away from the exact location of the valve.

Another feature of this invention is the use of a protective grating, such as a wire mesh for covering the valve outlet at the bottom of the feed compartment. Without this mesh squirrels would be able to run under the feeder and push the reciprocating valve up to feed themselves, which obviously would defeat one of the important objects of the invention.

Another feature of the invention is the means for preventing large birds from robbing the feeder. This is accomplished in several ways. The valve is constructed so that only a very small amount of feed will be dispensed, thereby limiting the attractiveness of the device to larger birds. The feeding area is spaced a substantial distance away from the actuating means of the feed valve and this tends to discourage larger birds which are more sluggish than some birds. Perhaps the most important structural element is the feeding platform which is located beneath the feed container and spaced only a few inches from its bottom. This platform can, of course, be completely under the feed container, or it can extend outwardly a relatively short distance to provide a landing area. The critical consideration is to restrict the landing area at the feeding platform and to restrict the accessability to the dispendsed feeding to such an extend that larger birds, such as crows, will be unable to benefit from this device, whereas smaller birds may have full access to the feed platform.

In this connection it will be remembered that the primary object of this invention is to provide a bird feeding device for song birds as a means not only of preserving such wildlife, but also of providing an interesting hobby for those who wish to observe song birds feeding and who wish to avoid the more obnoxious birds, such as crows.

Another feature of this invention is the remoteness of the perch from the feed area. This feature is very important because it prevents animals from learning the relationship of the perch to the feeding, thereby giving rise to two major advantages of the invention. One is that squirrels and other robber animals cannot learn how to steal the feed and the other is that the birds flit back and forth in a most interesting pattern of play trying to find how to get the grain. They never seem to figure how to do so, but their natural tendency to land on the perch permits them to get the feed without ever knowing how it is done.

Other features and advantages of the invention will be more fully understood from the following detailed description and the attached drawings in which:

Fig. 1 is a perspective view of one form of bird feeder constructed in accordance with the present invention.

Fig. 2 is a longitudinal-sectional view taken along line 3—3 of the bird feeder shown in Fig. 1.

Fig. 3 is a transverse-sectional view taken along line 3—3 of the bird feeder shown in Fig. 1.

Fig. 4 is a perspective view of the other form of bird feeder constructed in accordance with the present invention.

Fig. 5 is a longitudinal-sectional view taken along line 5—5 of the bird feeder shown in Fig. 4.

Fig. 6 is a detailed view of the valve member shown in Figs. 4 and 5.

Referring now to that one of the preferred forms of the invention illustrated in Figs. 1 and 3, it will be seen that this novel bird feeder comprises a rectangular container 10 provided with tabs 11, 12 and 13 for attaching it to a tree, post, wall or the like. The container is provided with a close fitting removable top 16 and an underslung feed pan 18, all of which are preferably constructed from sheet metal. The container 10 is also provided with general U-shaped bottom 20 which in turn is provided with a central valve opening 22. As shown, the bottom 20 is affixed to the container 10 by means of screws, but other suitable attaching means may be substituted with equal facility. A valve assembly is provided for gravitationally dispensing grain or other bird feed from the container 10 to the feed pan 18 and this valve assembly includes in addition to the opening 22 a valve member 24 and perch-lever 26 attached to the valve member by means of screw 27. It will be noted that perch-lever 26 is fulcrumed in a suitable hole 28 provided in the forward wall of container 10. The lower portion of container 10 is turned inwardly to form a lower lip or ledge 30 which supports a heavy wire mesh 32 for the purpose of sealing off the valve assembly to prevent actuation of the valve member 24 by rodents who might otherwise rob the feeder. It will be understood that the mesh is large enough to permit any ordinary grain to pass freely through it.

It will be obvious from Fig. 2 that the valve assembly construction of this invention provides a reciprocating valve which depends for its operation upon actuation by a bird landing on the outer end of perch-lever 26. To avoid poor operation which would result if the container 10 were filled with grain and the grain were permitted to bear directly on top of valve member 24, a feed regulating member 40 is provided to divide the container 10 into two compartments; namely, an upper storage compartment and a lower feeding compartment. This feed regulating member is shaped in the form of an inverted U and is provided with openings 41 and 42 to permit gravity feed of grain from the storage compartment to the feeding compartment. This construction enables the valve operation to be independent of the weight of grain in the container. It will be noted that at diagonally opposite corners of the feed regulating member there are provided a pair of pins 43 and 44 for securing that member in its proper position relative to bottom 20.

It will be noted that feed pan 18 is provided with a landing perch 50 which in this instance extends under the perch 26 and just outwardly from the forward wall of container 10. It will also be noted that the bottom of the landing pan is spaced only about three inches from the bottom of container 10 so that song birds will freely move into the feed pan, whereas larger birds, such as crows, will stay out for fear of being trapped. Obviously, the structure of the landing area can be varied if one wishes to feed such birds.

Turning now to another preferred form of the invention illustrated in Figs. 4, 5 and 6, it will be seen that a container 110, also constructed of sheet metal, is adapted to be supported by three tabs, two of which are shown at 111 and 113. This container is provided with a top 116, a slanted bottom 120, a false bottom 121 and an underslung feed pan 118, provided with a landing area or perch 150. In this instance there is a separate feed container or compartment 200 provided with a bottom 202 which in turn has a valve opening 122. A feed regulating member 140 provides a common wall between the storage container 110 and the feed compartment 200. This member is provided with an opening 141 to permit grain to flow by gravity from the storage container to the feed compartment. The lower edge of both the storage container 110 and the feed compartment 200 are provided with a lip or ledge 130 for the purpose of supporting a relatively heavy wire mesh 132 for the purpose of keeping rodents away from the valve assembly.

A valve assembly is provided in feed compartment 200 and includes a valve member 124 and a perch-lever 126 connected to the top of the valve member by suitable means, including a hinge 129. The perch-lever is fulcrumed in a side wall of compartment 200 by means of aperture 128.

The two forms of the invention may be further defined as including a container having, in each instance, an upper storage compartment S (also identified as storage containers 10 and 110) and a lower feed compartment F (identified as 200 in Figs. 4 and 5) separated by a guard G (also identified as 20 and 120 in the above detailed descriptions). The valve in each feed compartment F has a top T and the guid G prevents accumulation of feed thereon in a weight sufficient to permit valve actuation by the weight of a small bird on the perches 26 and 126.

It will be noted that in both forms of the invention the preferred reciprocating valve member has an hour-glass shape formed of two halves 300 and 301 connected by a screw 27 and 127 which also serves to connect the perch-lever 26 and 126. It will further be noted that the outside diameter at the bottom and the top of valve member 124 is considerably larger than the diameter of hole 122, whereas the center of member 124 has a diameter much smaller than the diameter of hole 122. The operation in accordance with both forms of the invention is substantially the same. Storage containers 10 and 110 may be filled with grain to provide enough feed for a long period of operation, the length of the period depending on the size of the container which may hold enough grain for two weeks, a month or several months. The shape of bottoms 20 and 120 (cooperating with feed regulating means 40 and 140) is such that grain will be continuously fed from the storage container to the feed compartment by gravity alone so long as a substantial amount of grain remains in the storage container. By proper regulation of the size of holes 41 and 42, in one form of the invention, and hole 141 in the other form of the invention, in cooperation with the regulation of the angle of the container bottom and the distance between these holes and the respective valve openings 22 and 122 the level of grain in the bottom of the feed compartment may be effectively regulated. This level of grain in the feed compartment is relatively unimportant so long as the top of valve members 24 and 124 are kept relatively free of piled grain so that their reciprocation will be substantially independent of the weight of grain in the storage compartment. The operation of the valve assembly appears clear from the drawing. A bird landing on perch-lever 126 will lift valve member 124 and dispense a small amount of grain, but as long as the bird sits on the perch no additional grain will be dispensed because the valve is obviously closed in the position shown in full lines in Fig. 5. When the bird flies off the perch the valve will automatically fall to the closed position shown in dotted lines in Fig. 5 and full lines in Fig. 2 dispensing a small amount of grain as it travels between the closed positions. By regulating the size and nature of the valve member 24 one can very effectively regulate the amount of grain which will be fed at any single landing. It should be noted that the effective weight of the valve members 24 and 124 and that part of perch-levers 26 and 126 inside the feed compartment is carefully regulated in relation to the effective weight of that part of perch-levers 26 and 126, respectively, outside the feed compartment so that the mere weight of a small bird landing on perch-lever will be sufficient to raise the valve member so that such birds may be fed without human assistance.

By placing the feeding areas (pans 18 and 118) at a position remote from the actuating device (perch-levers 26 and 126) a most interesting effect is obtained. Birds being fed have to continuously fly back and forth between the perch-lever and the feed pan and they never seem to master the relationship between the two. This, of course, gives rise to a very interesting pattern of bird play and provides a source of delight for the birdwatchers.

It will be obvious that the invention just described embodies not only a novel combination of features but also a large number of features which may be used in other combinations with some of the excellent advantages described herein. It will also be obvious that the invention is not strictly limited to the precise constructions illustrated, but the principles disclosed herein may be embodied in other similar forms and modifications by those skilled in the art.

I claim:

1. A bird feeder comprising a storage compartment in gravity flow relation to a feed compartment, said storage compartment having walls including a feed supporting section and said feed compartment having walls including a bottom wall provided with a valve receiving opening and a second wall forming a feed flow control guard with an aperture adjacent said feed supporting section and spaced from said valve receiving opening for permitting said gravity flow, a valve member including an elongate center portion in said valve opening and an enlarged portion at each end above and below said opening and adapted to close it in both the raised and lowered position of said valve member, and an operating lever having one end connected to said valve member, an intermediate portion pivotally supported and the other end formed as a perch, said valve member being movable between upper and lower closed positions by the weight of a bird landing on said perch to discharge regulated quantities of feed through said discharge opening to an area of feed.

2. A bird feeder as set forth in claim 1 wherein said storage compartment and feed compartment are formed in a single container with a common wall forming both the second wall of the feed compartment and a feed supporting section for said storage compartment.

3. A bird feeder as set forth in claim 1 wherein said common wall slopes downwardly from a central portion towards its outer sides and the apertures are provided at the outer sides thereof.

4. A bird feeder as set forth in claim 3 wherein the bottom wall of the feed section slopes downwardly from its sides toward the center and the valve opening is located adjacent the center.

5. A bird feeder as set forth in claim 4 wherein said common wall is removable and replaceable.

6. A bird feeder as set forth in claim 1 wherein said feed compartment and said storage compartment are arranged in side-by-side relationship with a common wall forming a side wall of said storage compartment and said second wall of said feed compartment.

7. A bird feeder as set forth in claim 1 wherein a feed pan is positioned beneath said feed compartment and spaced from said valve receiving opening a distance permitting entry of small birds between the bottom of the feed compartment and the pan but discouraging entry of larger birds.

8. A bird feeder as set forth in claim 1 wherein the position of said pivotal support in relation to the weight at the opposite ends of said operating lever is such that the valve member is normally held in its lower closed position by a weight not exceeding that of a small song bird.

9. A bird feeder comprising an upper storage compartment for granular feed and a lower feed compartment having a bottom provided with a discharge opening therein, a valve member including an elongate portion in said opening and enlarged end portions for closing said opening, an operating lever having one end connected to said valve member, an intermediate portion pivotally supported and one end formed as a perch for a bird, a common wall between said compartments forming a feed flow control guard and provided with an aperture adjacent the lower portion of said storage compartment and spaced laterally from said discharge opening such a distance that the angle of repose of the granular material extending from said aperture towards said discharge opening limits the thickness and weight of the granular material above the valve member to a negligible minimum, said valve member being movable between upper and lower closed positions by the weight of a bird landing on said perch to discharge regulated quantities of feed through said discharge opening to an area of feed.

10. A bird feeder as set forth in claim 9 wherein said storage compartment is directly above said feed compartment and said common wall extends generally horizontally.

11. A bird feeder as set forth in claim 9 wherein said compartments are in side-by-side relationship and the common wall extends generally vertically.

12. A bird feeder as set forth in claim 9 wherein said pivotal support for said operating lever is a side wall of said feed compartment.

13. A bird feeder as set forth in claim 9 wherein the position of said pivotal support in relation to the weight at the opposite ends of said operating lever is such that the valve member is normally held in its lower closed position by a weight not exceeding that of a small song bird.

References Cited in the file of this patent

UNITED STATES PATENTS

| | | |
|---|---|---|
| 70,401 | Bowerman | Nov. 5, 1867 |
| 1,019,975 | Logan | Mar. 12, 1912 |
| 1,257,638 | Robbins | Feb. 26, 1918 |
| 1,334,006 | Welshausen | Mar. 16, 1920 |
| 1,449,485 | Alspack | Mar. 27, 1923 |
| 2,097,719 | Brembeck | Nov. 2, 1937 |
| 2,541,622 | Toadvine | Feb. 13, 1951 |
| 2,773,474 | Dodds | Dec. 11, 1956 |

FOREIGN PATENTS

| | | |
|---|---|---|
| 3,063 | Switzerland | Sept. 26, 1891 |